(12) United States Patent
Tamate (10) Patent No.: US 11,811,458 B2
(45) Date of Patent: Nov. 7, 2023

(54) POWER SOURCING EQUIPMENT, POWERED DEVICE AND POWER OVER FIBER SYSTEM

(71) Applicant: KYOCERA CORPORATION, Kyoto (JP)

(72) Inventor: Shuichi Tamate, Hino (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 17/620,067

(22) PCT Filed: Jun. 19, 2020

(86) PCT No.: PCT/JP2020/024059
§ 371 (c)(1),
(2) Date: Dec. 16, 2021

(87) PCT Pub. No.: WO2021/014845
PCT Pub. Date: Jan. 28, 2021

(65) Prior Publication Data
US 2022/0368426 A1    Nov. 17, 2022

(30) Foreign Application Priority Data

Jul. 22, 2019   (JP) ................................. 2019-134234

(51) Int. Cl.
*H04B 10/548*   (2013.01)
*H04B 10/532*   (2013.01)

(52) U.S. Cl.
CPC ......... *H04B 10/548* (2013.01); *H04B 10/532* (2013.01)

(58) Field of Classification Search
CPC .................................................... H04B 10/532
See application file for complete search history.

(56) References Cited

U.S. PATENT DOCUMENTS

2011/0278440 A1*  11/2011  Chan ............... H04B 10/807
                                                        359/237
2012/0237202 A1*  9/2012  Abe ................ H04B 10/6164
                                                         398/16
(Continued)

FOREIGN PATENT DOCUMENTS

JP   H8321810 A    12/1996
JP   2010135989 A   6/2010
(Continued)

OTHER PUBLICATIONS

Yukiyoshi Kamio, et al., "80-Gb/s 256-QAM Signals using Phase Noise and DGD-Tolerant Pilot-Carrier-Aided Homodyne Detection", 33rd European Conference and Exhibition on Optical Communication (ECOC 2007), 2007, 2pp.

*Primary Examiner* — Nathan M Cors
(74) *Attorney, Agent, or Firm* — HAUPTMAN HAM, LLP (57) ABSTRACT

A power sourcing equipment includes a laser oscillator and a modulator. The laser oscillator converts electric power into feed light. The modulator modulates, based on transmission information, a phase of the feed light output from the laser oscillator. The feed light phase-modulated by the modulator is output to outside of the power sourcing equipment. A powered device includes a photoelectric conversion element and a demodulator. The photoelectric conversion element converts feed light input from outside of the powered device into electric power. The demodulator detects a phase of the feed light to restore transmission information.

7 Claims, 6 Drawing Sheets

(56) References Cited

U.S. PATENT DOCUMENTS

| | | | |
|---|---|---|---|
| 2014/0126916 A1* | 5/2014 | Ota | H04B 10/2569 398/208 |
| 2015/0117864 A1 | 4/2015 | Hyde et al. | |
| 2017/0093501 A1* | 3/2017 | Meitl | H01L 31/105 |

FOREIGN PATENT DOCUMENTS

| | | |
|---|---|---|
| JP | 201128087 A | 2/2011 |
| JP | 2013532408 A | 8/2013 |

* cited by examiner

FIG.1

POWER SOURCING EQUIPMENT, POWERED DEVICE AND POWER OVER FIBER SYSTEM

RELATED APPLICATIONS

The present application is a National Phase of International Application Number PCT/JP2020/024059, filed Jun. 19, 2020, which claims priority to Japanese Application number 2019-134234 file Jul. 22, 2019.

TECHNICAL FIELD

The present disclosure relates to a power sourcing equipment, a powered device and a power over fiber system.

BACKGROUND ART

Recently, there has been studied an optical power supply system that converts electric power into light (called feed light), transmits the feed light, converts the feed light into electric energy, and uses the electric energy as electric power. There is disclosed in Patent Literature 1 an optical communication device that includes: an optical transmitter that transmits signal light modulated with an electric signal and feed light for supplying electric power; an optical fiber including a core that transmits the signal light, a first cladding that is formed around the core, has a refractive index lower than that of the core, and transmits the feed light, and a second cladding that is formed around the first cladding, and has a refractive index lower than that of the first cladding; and an optical receiver that operates with electric power obtained by converting the feed light transmitted through the first cladding of the optical fiber, and converts the signal light transmitted through the core of the optical fiber into the electric signal.

CITATION LIST

Patent Literature

Patent Literature 1: JP 2010-135989 A

Summary of Invention

Problem to Solve

In conventional optical power supply, feed light is merely a medium to transmit energy.

Solution to Problem

A power sourcing equipment of the present disclosure includes:
 a laser oscillator that converts electric power into feed light; and
 a modulator that modulates, based on transmission information, a phase of the feed light output from the laser oscillator,
 wherein the feed light phase-modulated by the modulator is output to outside of the power sourcing equipment.

A powered device of the present disclosure includes:
 a photoelectric conversion element that converts feed light input from outside of the powered device into electric power; and
 a demodulator that detects a phase of the feed light to restore transmission information.

A power over fiber system of the present disclosure includes:
 the above power sourcing equipment;
 the above powered device; and
 an optical fiber that transmits the feed light from the power sourcing equipment to the powered device.

DESCRIPTION OF EMBODIMENTS

Hereinafter, embodiments of the present disclosure will be described with reference to the drawings.

(1) Outline of System

First Embodiment

Figure 1:
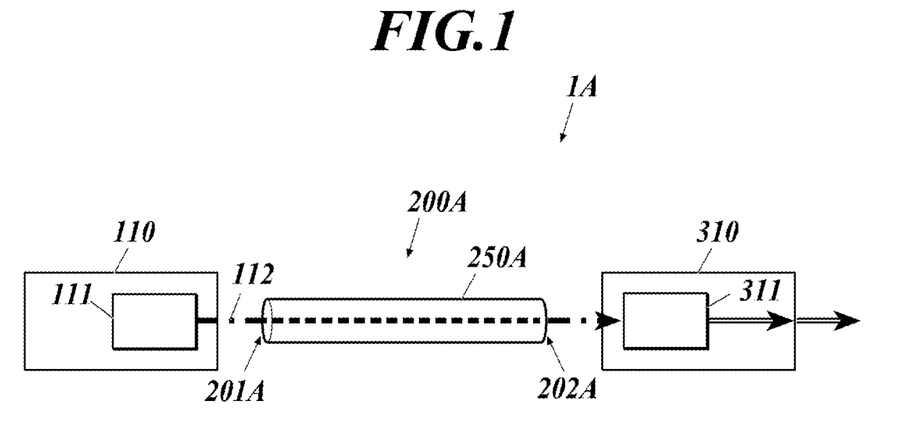
FIG. 1 is a block diagram of a power over fiber system according to a first embodiment of the present disclosure.

As shown in FIG. 1, a power over fiber (PoF) system 1A of this embodiment includes a power sourcing equipment (PSE) 110, an optical fiber cable 200A and a powered device (PD) 310.

In the present disclosure, a power sourcing equipment converts electric power into optical energy and supplies (sources) the optical energy, and a powered device receives (draws) the supplied optical energy and converts the optical energy into electric power.

The power sourcing equipment 110 includes a semiconductor laser 111 for power supply.

The optical fiber cable 200A includes an optical fiber 250A that forms a transmission path of feed light.

The powered device 310 includes a photoelectric conversion element 311.

The power sourcing equipment 110 is connected to a power source, and electrically drives the semiconductor laser 111 and so forth.

The semiconductor laser 111 oscillates with the electric power from the power source, thereby outputting feed light 112.

The optical fiber cable 200A has one end 201A connectable to the power sourcing equipment 110 and the other end 202A connectable to the powered device 310 to transmit the feed light 112.

The feed light 112 from the power sourcing equipment 110 is input to the one end 201A of the optical fiber cable 200A, propagates through the optical fiber 250A, and is output from the other end 202A of the optical fiber cable 200A to the powered device 310.

The photoelectric conversion element 311 converts the feed light 112 transmitted through the optical fiber cable 200A into electric power. The electric power obtained by the conversion of the feed light 112 by the photoelectric conversion element 311 is driving power needed in the powered device 310. The powered device 310 is capable of outputting, for an external device(s), the electric power obtained by the conversion of the feed light 112 by the photoelectric conversion element 311.

Semiconductor materials of semiconductor regions of the semiconductor laser 111 and the photoelectric conversion element 311 are semiconductors having a laser wavelength being a short wavelength of 500 nm or less. The semiconductor regions exhibit light-electricity conversion effect.

Semiconductors having a laser wavelength being a short wavelength have a large band gap and a high photoelectric conversion efficiency, and hence improve photoelectric conversion efficiency at the power supplying side and the power receiving side in optical power supply, and improve optical power supply efficiency.

Hence, as the semiconductor materials, laser media having a laser wavelength (base wave) of 200 nm to 500 nm may be used. Examples thereof include diamond, gallium oxide, aluminum nitride and gallium nitride.

Further, as the semiconductor materials, semiconductors having a band gap of 2.4 eV or greater are used.

For example, laser media having a band gap of 2.4 eV to 6.2 eV may be used. Examples thereof include diamond, gallium oxide, aluminum nitride and gallium nitride.

Laser light having a longer wavelength tends to have a higher transmission efficiency, whereas laser light having a shorter wavelength tends to have a higher photoelectric conversion efficiency. Hence, when laser light is transmitted for a long distance, laser media having a laser wavelength (base wave) of greater than 500 nm may be used as the semiconductor materials, whereas when the photoelectric conversion efficiency is given priority, laser media having a laser wavelength (base wave) of less than 200 nm may be used as the semiconductor materials.

Any of these semiconductor materials may be used in one of the semiconductor laser 111 and the photoelectric conversion element 311. This improves the photoelectric conversion efficiency at either the power supplying side or the power receiving side, and improves the optical power supply efficiency.

Second Embodiment

Figure 2:
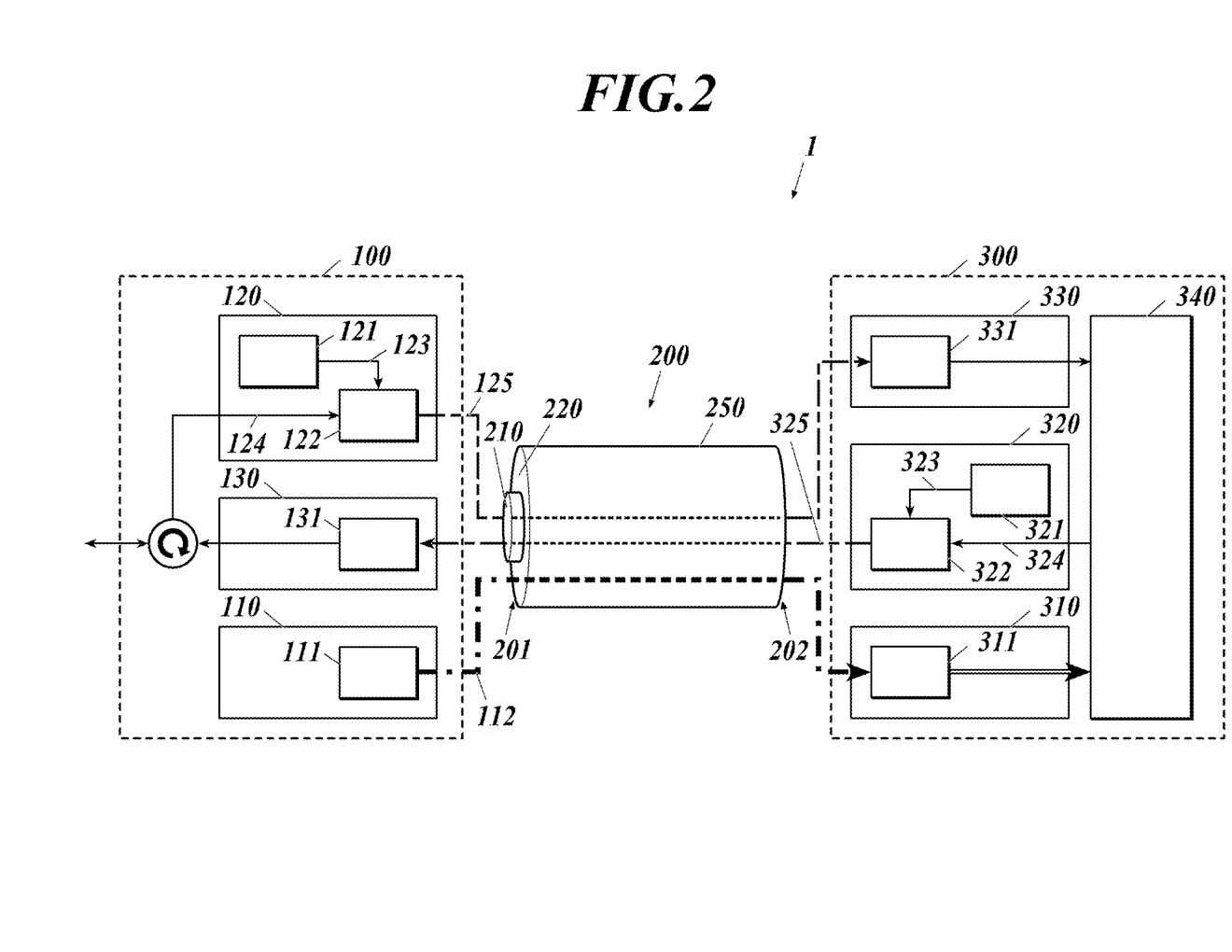
FIG. 2 is a block diagram of a power over fiber system according to a second embodiment of the present disclosure.

As shown in FIG. 2, a power over fiber (PoF) system 1 of this embodiment includes a power supply system through an optical fiber and an optical communication system therethrough, and includes: a first data communication device 100 including a power sourcing equipment (PSE) 110; an optical fiber cable 200; and a second data communication device 300 including a powered device (PD) 310.

The power sourcing equipment 110 includes a semiconductor laser 111 for power supply. The first data communication device 100 includes, in addition to the power sourcing equipment 110, a transmitter 120 and a receiver 130 for data communication. The first data communication device 100 corresponds to a data terminal equipment (DTE), a repeater or the like. The transmitter 120 includes a semiconductor laser 121 for signals and a modulator 122. The receiver 130 includes a photodiode 131 for signals.

The optical fiber cable 200 includes an optical fiber 250 including: a core 210 that forms a transmission path of signal light; and a cladding 220 that is arranged so as to surround the core 210 and forms a transmission path of feed light.

The powered device 310 includes a photoelectric conversion element 311. The second data communication device 300 includes, in addition to the powered device 310, a transmitter 320, a receiver 330 and a data processing unit 340. The second data communication device 300 corresponds to a power end station or the like. The transmitter 320 includes a semiconductor laser 321 for signals and a modulator 322. The receiver 330 includes a photodiode 331 for signals. The data processing unit 340 processes received signals. The second data communication device 300 is a node in a communication network. The second data communication device 300 may be a node that communicates with another node.

The first data communication device 100 is connected to a power source, and electrically drives the semiconductor laser 111, the semiconductor laser 121, the modulator 122, the photodiode 131 and so forth. The first data communication device 100 is a node in a communication network. The first data communication device 100 may be a node that communicates with another node.

The semiconductor laser 111 oscillates with the electric power from the power source, thereby outputting feed light 112.

The photoelectric conversion element 311 converts the feed light 112 transmitted through the optical fiber cable 200 into electric power. The electric power obtained by the conversion of the feed light 112 by the photoelectric conversion element 311 is driving power needed in the second data communication device 300, for example, driving power for the transmitter 320, the receiver 330 and the data processing unit 340. The second data communication device 300 may be capable of outputting, for an external device(s), the electric power obtained by the conversion of the feed light 112 by the photoelectric conversion element 311.

The modulator 122 of the transmitter 120 modulates laser light 123 output by the semiconductor laser 121 to signal light 125 on the basis of transmission data 124, and outputs the signal light 125.

The photodiode 331 of the receiver 330 demodulates the signal light 125 transmitted through the optical fiber cable 200 to an electric signal, and outputs the electric signal to the data processing unit 340. The data processing unit 340 transmits data of the electric signal to a node, and also receives data from the node and outputs the data to the modulator 322 as transmission data 324.

The modulator 322 of the transmitter 320 modulates laser light 323 output by the semiconductor laser 321 to signal light 325 on the basis of the transmission data 324, and outputs the signal light 325.

The photodiode 131 of the receiver 130 demodulates the signal light 325 transmitted through the optical fiber cable 200 to an electric signal, and outputs the electric signal. Data of the electric signal is transmitted to a node, whereas data from the node is the transmission data 124.

The feed light 112 and the signal light 125 from the first data communication device 100 are input to one end 201 of the optical fiber cable 200, propagate through the cladding 220 and the core 210, respectively, and are output from the other end 202 of the optical fiber cable 200 to the second data communication device 300.

The signal light 325 from the second data communication device 300 is input to the other end 202 of the optical fiber cable 200, propagates through the core 210, and is output from the one end 201 of the optical fiber cable 200 to the first data communication device 100.

Figure 3:
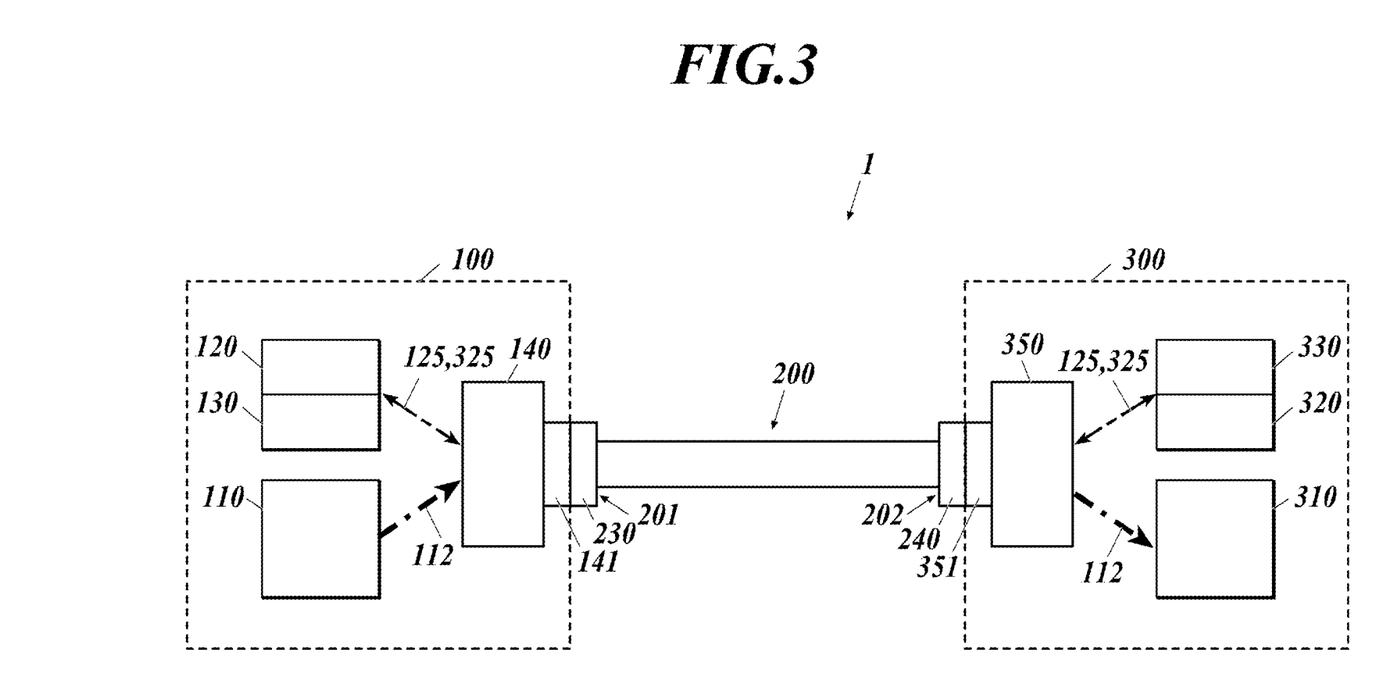
FIG. 3 is a block diagram of the power over fiber system according to the second embodiment of the present disclosure and shows optical connectors and so forth.

As shown in FIG. 3, the first data communication device 100 includes a light input/output part 140 and an optical connector 141 attached to the light input/output part 140, and the second data communication device 300 includes a light input/output part 350 and an optical connector 351 attached to the light input/output part 350. An optical connector 230 provided at the one end 201 of the optical fiber cable 200 is connected to the optical connector 141, and an optical connector 240 provided at the other end 202 of the optical fiber cable 200 is connected to the optical connector 351. The light input/output part 140 guides the feed light 112 to the cladding 220, guides the signal light 125 to the core 210, and guides the signal light 325 to the receiver 130. The light input/output part 350 guides the feed light 112 to the powered device 310, guides the signal light 125 to the receiver 330, and guides the signal light 325 to the core 210.

As described above, the optical fiber cable 200 has the one end 201 connectable to the first data communication device 100 and the other end 202 connectable to the second data communication device 300 to transmit the feed light 112. In this embodiment, the optical fiber cable 200 transmits the signal light 125, 325 bidirectionally.

As the semiconductor materials of the semiconductor regions, which exhibit the light-electricity conversion effect, of the semiconductor laser 111 and the photoelectric conversion element 311, any of those described in the first embodiment can be used, thereby achieving a high optical power supply efficiency.

Figure 4:
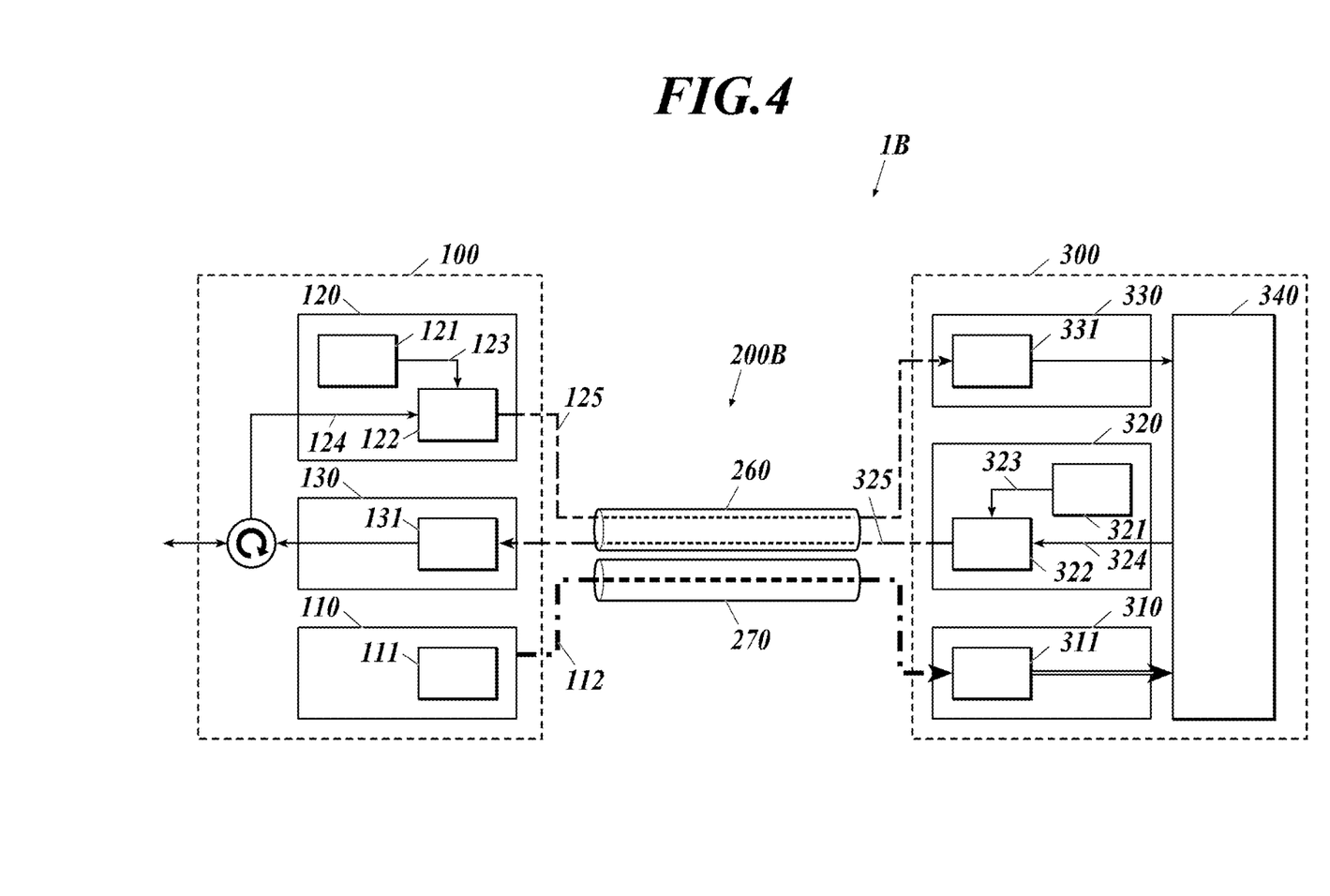
FIG. 4 is a block diagram of a power over fiber system according to another embodiment of the present disclosure.

Like an optical fiber cable 200B of a power over fiber system 1B shown in FIG. 4, an optical fiber 260 that transmits signal light and an optical fiber 270 that transmits feed light may be provided separately. Further, the optical fiber cable 200B may be composed of a plurality of optical fiber cables.

(2) Means for Communicating Information Using Feed Light

Next, a power over fiber system to which a means for communicating information using feed light is applied will be described.

Third Embodiment

Figure 5:
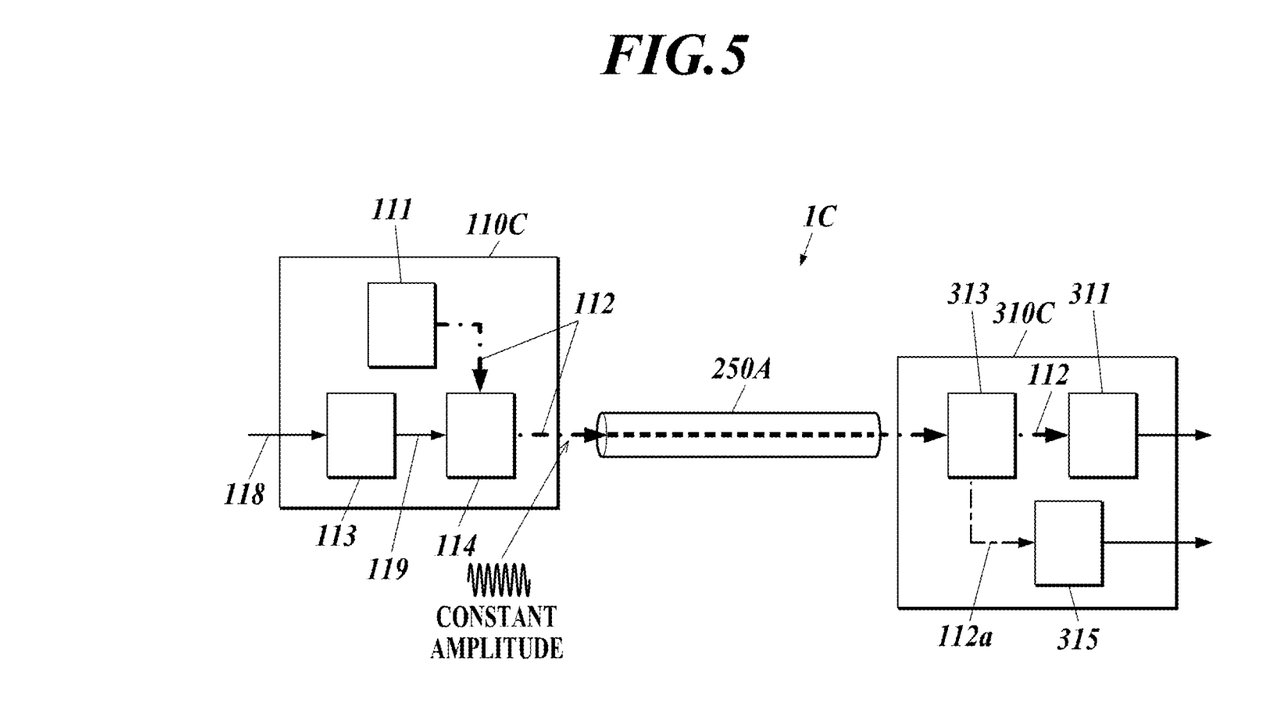
FIG. 5 is a block diagram of a power over fiber system according to a fourth embodiment to which a means for communicating information using feed light is applied.

FIG. 5 is a block diagram of a power over fiber system according to a third embodiment to which a means for communicating information using feed light is applied. In FIG. 5, the components same as those described above are denoted by the same reference signs, and detailed descriptions thereof are omitted. A power over fiber system 1C of the third embodiment includes a power sourcing equipment 110C, a powered device 310C and an optical fiber 250A.

The power sourcing equipment 110C includes a semiconductor laser 111 for power supply as a laser oscillator, a signal processor 113 that generates a modulation signal 119 (signal to modulate a carrier wave) from transmission information 118, and a modulator 114 that modulates the phase of the feed light 112 in accordance with the modulation signal. As the modulator 114, various phase modulators are usable. Examples thereof include an electro-optical modulator that changes, with an electric signal, permittivity of a transmission path through which the feed light 112 propagates, a spatial light modulator, and a modulator that utilizes cross-phase modulation. The power sourcing equipment 110C outputs, to one end of the optical fiber 250A, the feed light 112 with the transmission information 118 superimposed by phase modulation and having constant amplitude. The amplitude of the feed light 112 output by the power sourcing equipment 110C may vary on the basis of a requirement different from information communication.

The powered device 310C includes an optical branching part 313 that causes a portion to branch off from the feed light 112 input through the optical fiber 250A, a photoelectric conversion element 311 that converts the remaining feed light 112, from which the portion has branched off, into electric power, and a demodulator 315 that detects the phase of a feed beam 112a as the branched-off portion to restore the transmission information. The optical branching part 313 causes the feed light 112 to branch at a branching ratio of different quantities, and transmits the feed beam 112a the quantity of which is smaller to the demodulator 315. As the optical branching part 313, various optical branching devices are usable. Examples thereof include a fiber-type optical coupler and a waveguide-type splitter. As the demodulator 315, for example, a delay detector or a synchronous detector may be used. The delay detector causes the feed beam 112a to further branch into two portions, and performs phase detection by delaying one portion of these and making it interfere with the other portion. The synchronous detector performs phase detection by making reference laser light generated by the powered device 310C interfere with the feed beam 112a.

According to the power over fiber system 1C of the third embodiment, the transmission information 118 can be transmitted from the power sourcing equipment 110C to the powered device 310C by using the feed light 112. Further, the power sourcing equipment 110C puts the transmission information 118 on the feed light 112 by phase modulation, and the powered device 310C extracts the transmission information 118 by performing phase detection on the feed light 112. This allows the amplitude of the feed light 112 not to be limited for information communication, and can suppress influence of the transmission information 118 on the magnitude of transmission energy. Hence, for example, the amplitude of the feed light 112 can be set to a desired value, such as a value at which a high energy transmission efficiency is obtained or a value for required electric power.

Further, according to the power over fiber system 1C of the third embodiment, the optical branching part of the powered device 310C causes a portion to branch off from the input feed light 112, and transmits the feed beam 112a, which is the branched-off portion, to the demodulator 315. This prevents energy loss that occurs at the demodulator 315 from affecting the entire feed light 112, and can improve energy transmission efficiency in optical power supply. Further, the above can make intensity of the feed beam 112a input to the demodulator 315 low, and hence can lower input rating of the demodulator 315 and reduce component costs.

The means for communicating information using the feed light 112 of the third embodiment may be applied to any of the system configurations shown in FIG. 1, FIG. 2 and FIG. 4. More specifically, the power sourcing equipment 110C and the powered device 310C of the third embodiment replace the power sourcing equipment 110 and the powered device 310 shown in FIG. 1, FIG. 2 or FIG. 4, respectively, thereby achieving the above application. In the case of the application to the system configuration shown in FIG. 2, the feed light 112 carrying the transmission information 118 is transmitted through the optical fiber 250, whereas in the case of the application to the system configuration shown in FIG. 4, the feed light 112 carrying the transmission information 118 is transmitted through the optical fiber 270. In the case of the application to the system configuration shown in FIG. 2 or FIG. 4, two means for communicating information, namely, a means for communicating information using the signal light 125/325 and a means for communicating information using the feed light 112, are obtained.

Fourth Embodiment

Figure 6:
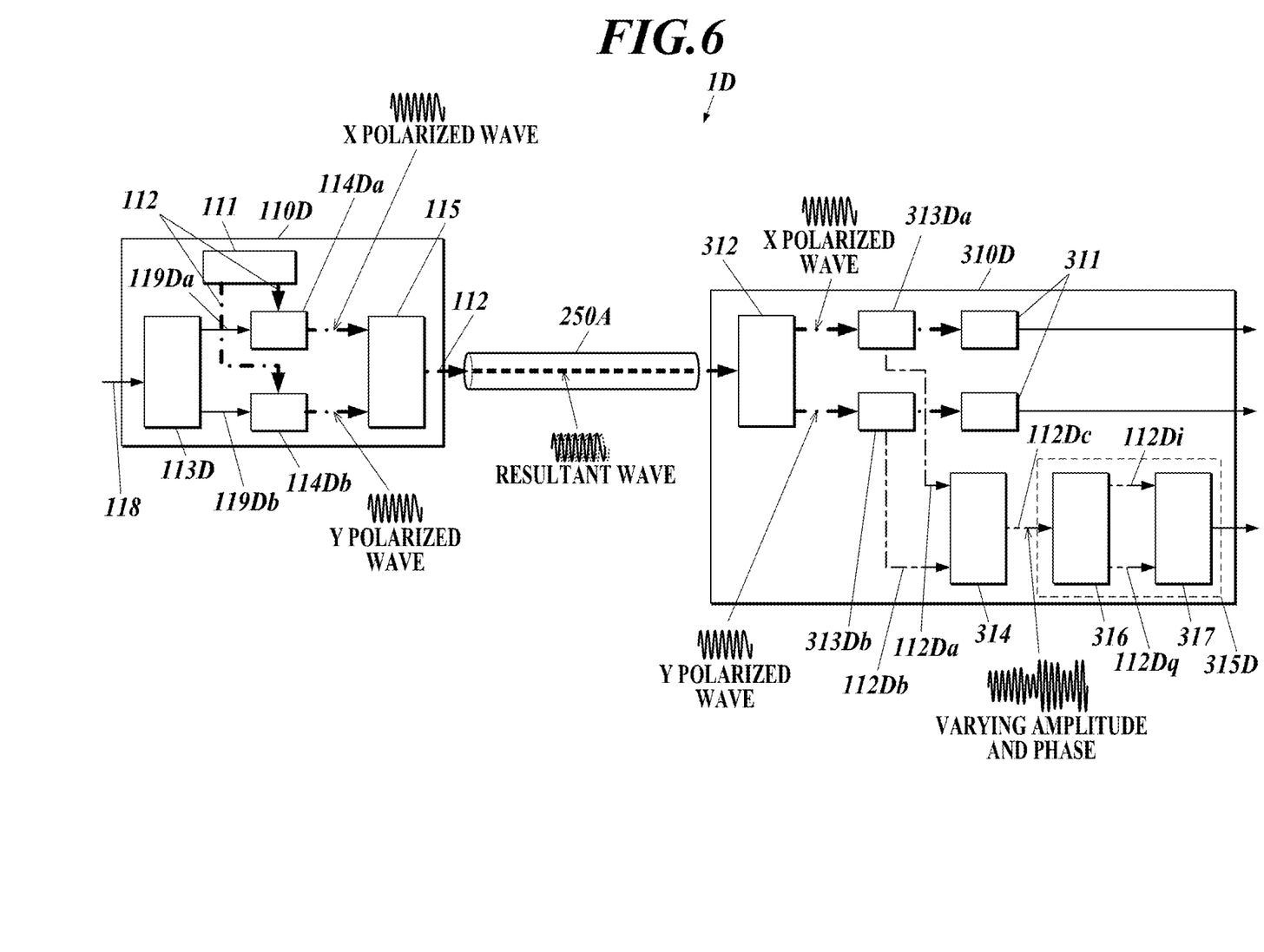
FIG. 6 is a block diagram of a power over fiber system according to a fifth embodiment to which means for communicating information using feed light is applied.

FIG. 6 is a block diagram of a power over fiber system according to a fourth embodiment to which a means for communicating information using feed light is applied. In FIG. 6, the components same as those described above are denoted by the same reference signs, and detailed descriptions thereof are omitted. A power over fiber system 1D of the fourth embodiment includes a power sourcing equipment 110D, a powered device 310D and an optical fiber 250A.

The power sourcing equipment 110D includes a semiconductor laser 111 for power supply as a laser oscillator, a signal processor 113D that generates modulation signals 119Da, 119Db (signals to modulate carrier waves) from transmission information 118, two modulators 114Da, 114Db that modulate the phases of feed beams 112, 112 by using the modulation signals, and an optical coupling part 115 that merges the two phase-modulated feed beams 112, 112. The power sourcing equipment 110D outputs merged (resultant) feed light 112 generated by the optical coupling part 115 to one end of the optical fiber 250A. When the amplitudes of the feed beams 112, 112 output from the semiconductor laser 111 are constant, the amplitude of the merged feed light 112 can be constant.

The semiconductor laser 111 outputs the feed beams 112, 112 to the two modulators 114Da, 114Db through two paths. The feed beams 112, 112 for the two paths may be generated by bifurcating output of one semiconductor laser 111, or may be two outputs of two semiconductor lasers 111 that operate in sync.

The signal processor 113D generates the two modulation signals 119Da, 119Db (signals to modulate carrier waves) such that an orthogonally-modulated wave is obtained when vectors of the two phase-modulated feed beams 112, 112 are combined. The orthogonal modulation means a modulation method by which a signal composed of superposed carrier waves having a phase difference of 90 degrees is a modulated wave. Usable examples of the orthogonal modulation include QAM (Quadrature Amplitude Modulation), multi-level QAM, PSK (Phase Shift Keying), multilevel PSK and OFDM (Orthogonal Frequency Division Multiplexing). The two modulators 114Da, 114Db modulate the phases of the feed beams 112, 112 in accordance with the modulation signals 119Da, 119Db, respectively. As the modulators 114Da, 114Db, those described above for the modulator 114 are usable. As the optical coupling part 115, various optical coupling devices are usable. Examples thereof include an optical-fiber-fused optical coupler and a waveguide-type optical coupler.

Polarization states of the feed beams 112, 112 that propagate through the two paths between the semiconductor laser 111 and the optical coupling part 115 are controlled, and the optical coupling part 115 merges the feed beam 112 in a first polarization state with the feed beam 112 in a second polarization state different from the second polarization state. As the first polarization state and the second polarization state, for example, X polarization having a polarization plane in the X-axis direction and Y polarization having a polarization plane in the Y-axis direction orthogonal to the X-axis direction may be adopted. Alternatively, as the first polarization state and the second polarization state, linear polarizations having polarization planes intersecting at an angle other than 90 degrees may be adopted. Still alternatively, circular polarizations or elliptical polarizations having different rotational directions, phases or both may be adopted. Yet alternatively, as the first polarization state and the second polarization state, polarization states that make the feed beams 112, 112 after merged interfere little and separable may be adopted. If optical fibers are interposed between the semiconductor laser 111, the modulators 114Da, 114Db and the optical coupling part 115, the polarization states can be controlled by using polarization-maintaining fibers as the optical fibers and adjusting connection angles (angles of rotational directions on optical axes) formed by the components and the polarization-maintaining fibers.

The powered device 310D includes a polarization separator 312 that separates the feed light 112 input through the optical fiber 250A into the feed beam 112 in the first polarization state (e.g., X polarization) and the feed beam 112 in the second polarization state (e.g., Y polarization), and optical branching parts 313Da, 313Db that cause a portion to branch off from the feed beam 112 in the first polarization state and a portion to branch off from the feed beam 112 in the second polarization state, respectively. As the polarization separator 312, various polarization separators are usable. Examples thereof include a polarization separating coupler, a waveguide-type polarization separator, and a polarization separator using a polarizing filter. The optical branching parts 313Da, 313Db cause the feed beams 112, 112 to branch at a branching ratio(s) of different quantities and transmit feed beams 112Da, 112Db the quantities of which are smaller to a vector combiner 314, respectively. When the amplitude of the feed light 112 supplied from the power sourcing equipment 110D is constant, the amplitudes of the feed beams 112Da, 112Db, which are the branched-off portions, are constant.

The order of polarization separation and branching of the feed light (beams) 112 may be reversed. That is, it is possible that after an optical branching part causes a portion to branch off from the feed light 112, a polarization separator separates the branched-off portion of the feed light 112 into the feed beam 112Da in the first polarization state and the feed beam 112Db in the second polarization state.

The powered device 310D further includes photoelectric conversion elements 311, 311 that convert the other feed beam (remaining feed light) 112 generated by the branching by the optical branching part 313Da into electric power and the other feed beam (remaining feed light) 112 generated by the branching by the optical branching part 313Db into electric power, respectively. The powered device 310D may have two photoelectric conversion elements 311, 311 corresponding to the optical branching parts 313Da, 313Db, or may have one photoelectric conversion element 311 that converts the two other feed beams 112, 112 generated by the branching by the optical branching parts 313Da, 313Db into electric power together.

The powered device 310D further includes the vector combiner 314 that combines the vectors of the feed beams 112Da, 112Db, which are the branched-off portions. The vector combiner 314 combines the feed beam 112Da in the first polarization state (e.g., X polarization) with the feed beam 112Db in the second polarization state (e.g., Y polarization) with the polarization states brought close to one another. For example, in the case of linear polarizations, the vector combiner 314 makes their polarization planes the same or brings these close to one another, and then performs the combining. This combining generates combined feed light 112Dc the amplitude of which is large when the phases of the feed beams 112Da, 112Db are close to one another, and is small when the phases of the feed beams 112Da, 112Db are close to 180 degrees, namely, generates combined feed light 112Dc having varying amplitude and phase. The combined feed light 112Dc has a waveform in which two carrier waves the phase angles of which are orthogonal to one another are combined. Since the signal processor 113D of the power sourcing equipment 110D generates the modulation signals 119Da, 119Db such that the combined feed light 112Dc is an orthogonally-modulated wave (by multilevel QAM, multilevel PSK, OFDM, etc.), the feed light 112Dc orthogonally modulated is obtained from the vector combiner 314.

The powered device 310D further includes a demodulator 315D. The demodulator 315D includes a 90-degree hybrid 316 that separates the feed light 112Dc having varying amplitude and phase into an in-phase component 112Di and a quadrature phase component 112Dq, and an extractor 317 that extracts the transmission information by detecting the amplitude of each output of the 90-degree hybrid 316. The separation into the in-phase component 112Di and the quadrature phase component 112Dq may be rephrased as phase detection of an in-phase component and phase detection of a quadrature phase component. The 90-degree hybrid 316 corresponds to an optical circuit. As the 90-degree hybrid 316, for example, a component may adopted, the component extracting an in-phase component and a quadrature phase component of unmodulated light by making the unmodulated light of the same frequency as the feed light 112, the unmodulated light being generated in the powered device 310D, interfere with the feed light 112Dc. The extractor 317 converts the amplitude (power) of each of the in-phase component 112Di and the quadrature phase component 112Dq of the feed light 112Dc into an electric signal, and obtains the transmission information by combining the vectors of these signals on the plane of Q-I axes.

As the component that obtains the transmission information from the feed light 112Dc having varying amplitude and phase, a component may be adopted, the component photoelectrically converting the feed light 112Dc, separating an electric signal generated by the photoelectric conversion into a signal of an in-phase component and a signal of a quadrature phase component, and then extracting the transmission information from the signals. Alternatively, a component may be adopted, the component converting the waveform of the feed light 112Dc having varying amplitude and phase into digital data, and performing a conversion process on the digital data, thereby extracting the transmission information. The conversion process that is performed on the digital data includes a calculation process(es) equivalent to phase detection of the in-phase component and phase detection of the quadrature phase component of the feed light 112Dc.

According to the power over fiber system 1D of the fourth embodiment, the transmission information 118 can be transmitted from the power sourcing equipment 110D to the powered device 310D by using the feed light 112. Further, the power sourcing equipment 110D merges the not-amplitude-but-phase-modulated feed beam 112 in the first polarization state with the not-amplitude-but-phase-modulated feed beam 112 in the second polarization state and transmits the merged feed light 112 to the powered device 310D. This allows the amplitude of the feed light 112 not to be limited for information communication, and can suppress influence of the transmission information 118 on the magnitude of transmission energy. Hence, for example, the amplitude of the feed light 112 can be set to a desired value, such as a value at which a high energy transmission efficiency is obtained or a value for required electric power.

Further, according to the power over fiber system 1D of the fourth embodiment, the power sourcing equipment 110D transmits, to the powered device 310D, the feed beam 112 in the first polarization state and the feed beam 112 in the second polarization state phase-modulated by using the modulation signals 119Da, 119Db, which are different from one another. Further, the powered device 310D combines the vector of the feed beam 112 in the first polarization state with the vector of the feed beam 112 in the second polarization state, thereby generating the orthogonally-modulated feed light 112Dc having varying amplitude and phase, and then demodulates the feed light 112Dc having varying amplitude and phase. This enables information communication equivalent to orthogonal modulation, and can increase transmittable data capacity.

Further, according to the power over fiber system 1D of the fourth embodiment, the vectors-combined feed light 112Dc is separated, as light, into the in-phase component 112Di and the quadrature phase component 112Dq. This enables highly accurate information communication even when the feed light 112 of high frequency is the carrier wave(s).

The means for communicating information using the feed light 112 of the fourth embodiment may be applied to any of the system configurations shown in FIG. 1, FIG. 2 and FIG. 4. More specifically, the power sourcing equipment 110D and the powered device 310D of the fourth embodiment replace the power sourcing equipment 110 and the powered device 310 shown in FIG. 1, FIG. 2 or FIG. 4, respectively, thereby achieving the above application. In the case of the application to the system configuration shown in FIG. 2, the feed light 112 carrying the transmission information 118 is transmitted through the optical fiber 250, whereas in the case of the application to the system configuration shown in FIG. 4, the feed light 112 carrying the transmission information 118 is transmitted through the optical fiber 270. In the case of the application to the system configuration shown in FIG. 2 or FIG. 4, two means for communicating information, namely, a means for communicating information using the signal light 125/325 and a means for communicating information using the feed light 112, are obtained.

Although some embodiments of the present disclosure have been described above, these embodiments are made for purposes of illustration and example only. The present invention can be carried out in various other forms, and each component may be omitted, replaced or modified/changed within a range not departing from the scope of the present invention.

INDUSTRIAL APPLICABILITY

The present disclosure is applicable to a power sourcing equipment, a powered device and a power over fiber system.

REFERENCE SIGNS LIST

1A Power over Fiber System
1 Power over Fiber System
1B Power over Fiber System
1C Power over Fiber System
1D Power over Fiber System
100 First Data Communication Device
110 Power Sourcing Equipment
110C Power Sourcing Equipment
110D Power Sourcing Equipment
111 Semiconductor Laser for Power Supply (Laser Oscillator)
112 Feed Light/Beam
112Dc Feed Light
112Di In-phase Component
112Dq Quadrature Phase Component
113 Signal Processor 113D Signal Processor
114 Modulator
114Da Modulator (First Modulator)
114Db Modulator (Second Modulator)
115 Optical Coupling Part
118 Transmission Information
119 Modulation Signal
119Da Modulation Signal
119Db Modulation Signal
120 Transmitter
125 Signal Light
130 Receiver
140 Light Input/Output Part
141 Optical Connector
200A Optical Fiber Cable
200 Optical Fiber Cable
200B Optical Fiber Cable
210 Core
220 Cladding
250A Optical Fiber
250 Optical Fiber
260 Optical Fiber
270 Optical Fiber
300 Second Data Communication Device
310 Powered Device
310C Powered Device
310D Powered Device
311 Photoelectric Conversion Element
313 Optical Branching Part
313Da Optical Branching Part
313Db Optical Branching Part
314 Vector Combiner
315 Demodulator
315D Demodulator
316 90-degree Hybrid (Optical Circuit)
317 Extractor
320 Transmitter
325 Signal Light
330 Receiver
350 Light Input/Output Part
351 Optical Connector

The invention claimed is:

1. A power sourcing equipment, comprising:
a laser oscillator configured to convert electric power into feed light; and
a modulator configured to modulate, based on transmission information, a phase of the feed light output from the laser oscillator, wherein the modulator includes a first modulator and a second modulator; and
an optical coupling part configured to merge a feed beam of the feed light in a first polarization state phase-modulated by the first modulator and a feed beam of the feed light in a second polarization state different from the first polarization state phase-modulated by the second modulator, thereby generating merged feed light, wherein
the laser oscillator is configured to output the feed light to the first modulator and the second modulator,
the feed light phase-modulated by the first modulator and the feed light phase-modulated by the second modulator are output to the optical coupling part, and
the merged feed light generated by the optical coupling part is output to outside of the power sourcing equipment.

2. The power sourcing equipment according to claim 1, further comprising:
a signal processor configured to generate modulation signals from the transmission information and output the modulation signals to the first modulator and the second modulator.

3. A powered device, comprising:
a photoelectric conversion element that converts feed light input from outside of the powered device into electric power;
a demodulator that detects a phase of the feed light to restore transmission information;
a polarization separator that separates the input feed light into a feed beam in a first polarization state and a feed beam in a second polarization state different from the first polarization state; and
a vector combiner that combines the feed beam in the first polarization state with the feed beam in the second polarization state with the first polarization state and the second polarization state brought toward one another, thereby generating combined feed light, wherein
the combined feed light generated by the vector combiner is transmitted to the demodulator.

4. The powered device according to claim 3, further comprising:
an optical branching part that causes the feed light to branch, wherein
a portion and another portion into which the optical branching part has caused the feed light to branch are transmitted to the demodulator and the photoelectric conversion element, respectively.

5. The powered device according to claim 3, wherein the demodulator includes:
an optical circuit that separates the combined feed light generated by the vector combiner into an in-phase component and a quadrature phase component; and
an extractor that extracts the transmission information from the in-phase component of the combined feed light and the quadrature phase component of the combined feed light.

6. The powered device according to claim 4, wherein the demodulator includes:
an optical circuit that separates the combined feed light generated by the vector combiner into an in-phase component and a quadrature phase component; and
an extractor that extracts the transmission information from the in-phase component of the combined feed light and the quadrature phase component of the combined feed light.

7. A system, comprising:
a laser oscillator that converts electric power into feed light;
a modulator that modulates, based on transmission information, a phase of the feed light output from the laser oscillator, wherein the feed light phase-modulated by the modulator is output to outside of the power sourcing equipment;
a photoelectric conversion element that converts the feed light input from outside of the powered device into electric power;
a demodulator that detects a phase of the feed light to restore transmission information;
a polarization separator that separates the feed light into a feed beam in a first polarization state and a feed beam in a second polarization state different from the first polarization state; and
a vector combiner that combines the feed beam in the first polarization state with the feed beam in the second polarization state with the first polarization state and the second polarization state brought toward one another, thereby generating combined feed light, wherein the combined feed light generated by the vector combiner is transmitted to the demodulator.

\* \* \* \* \*